US012657945B2

(12) United States Patent
Zagaynov et al.

(10) Patent No.: US 12,657,945 B2
(45) Date of Patent: Jun. 16, 2026

(54) PROCESSING IMAGES OF DEFORMED INDICIA-BEARING SURFACES

(71) Applicant: ABBYY Development Inc., Dover, DE (US)

(72) Inventors: Ivan Zagaynov, Dolgoprudniy (RU); Dmitry Solntsev, Moscow (RU); Alina Kalyakina, London (GB)

(73) Assignee: ABBYY Development Inc., Dover, DE (US)

( * ) Notice: Subject to any disclaimer, the term of this patent is extended or adjusted under 35 U.S.C. 154(b) by 287 days.

(21) Appl. No.: 18/512,354

(22) Filed: Nov. 17, 2023

(65) Prior Publication Data

US 2025/0166403 A1    May 22, 2025

(51) Int. Cl.
*G06V 30/16*        (2022.01)
*G06V 30/18*        (2022.01)
*G06V 30/19*        (2022.01)
*G06V 30/40*        (2022.01)

(52) U.S. Cl.
CPC .... *G06V 30/1607* (2022.01); *G06V 30/18095* (2022.01); *G06V 30/19107* (2022.01); *G06V 30/40* (2022.01)

(58) Field of Classification Search
CPC ......... G06V 30/1607; G06V 30/18095; G06V 30/19107; G06V 30/40; G06V 30/1478
See application file for complete search history.

(56) References Cited

U.S. PATENT DOCUMENTS

| | | | |
|---|---|---|---|
| 5,452,374 A | * | 9/1995 | Cullen ...................... G06T 7/70 |
| | | | 382/296 |
| 8,244,062 B2 | | 8/2012 | Dey |
| 8,731,336 B2 | | 5/2014 | Reese |
| 9,600,870 B2 | | 3/2017 | Meyer |
| 9,621,761 B1 | | 4/2017 | Abbas |

(Continued)

FOREIGN PATENT DOCUMENTS

CN        112926579 A        6/2021

OTHER PUBLICATIONS

Garani, Arpan Garai, et al., "Dewarping of document images: A semi-CNN based approach", Published May 20, 2021, 24 pages.

(Continued)

*Primary Examiner* — Wassim Mahrouka
(74) *Attorney, Agent, or Firm* — Lowenstein Sandler LLP

(57)        ABSTRACT

An example method of processing images of deformed indicia-bearing surfaces includes: detecting, within a document image, a plurality of image fragments, wherein each image fragment of the plurality of image fragment contains a respective sequence of alphabet symbols; grouping the plurality of image fragments by lines of text to be reconstructed in the document image; generating a map of isolines associated with the document image, wherein an isoline identifies a set of points that lie on a straight line of an undistorted image corresponding to the document image; generating a reverse transformation matrix that defines a set of transformations to be applied to the document image in order to remove image distortions caused by deformations of an indicia bearing surface; and generating an undistorted document image by applying the reverse transformation matrix to the document image.

20 Claims, 10 Drawing Sheets

(56)           References Cited

U.S. PATENT DOCUMENTS

| | | | |
|---|---|---|---|
| 2006/0222239 A1* | 10/2006 | Bargeron | G06V 30/40 |
| | | | 382/224 |
| 2007/0280554 A1* | 12/2007 | Chernichenko | G06T 7/536 |
| | | | 382/275 |
| 2009/0103808 A1* | 4/2009 | Dey | G06V 30/1478 |
| | | | 382/269 |
| 2011/0299775 A1* | 12/2011 | Kluzner | G06V 30/1478 |
| | | | 382/173 |
| 2012/0294528 A1* | 11/2012 | Li | H04N 1/3873 |
| | | | 382/173 |
| 2015/0243005 A1* | 8/2015 | Meyer | G06V 30/166 |
| | | | 382/182 |
| 2016/0210507 A1* | 7/2016 | Abdollahian | G06V 30/224 |

OTHER PUBLICATIONS

Hsieh, Ching-Tang, et al., Dep. of Electrical Engineering Tamkang University, New Taipei, Taiwan, R.O.C, "Restoring Warped Document Image Based on Text Line Correction", Jun. 2013, 6 pages.

* cited by examiner

910 Receive document image

920 Detect image fragments

930 Group image fragments by lines of text

940 Identify principal text direction

950 Generate map of isolines

960 Perform clustering of image fragments

970 Generate reverse transformation matrix

980 Reconstruct undistorted document image

PROCESSING IMAGES OF DEFORMED INDICIA-BEARING SURFACES

TECHNICAL FIELD

The implementations of the disclosure relate generally to computer systems and, more specifically, to systems and methods for processing images of deformed indicia-bearing surfaces.

BACKGROUND

An original document may be printed, typed, or hand-written on an indicia-bearing medium, such as paper, cloth, plastic, etc. As the indicia-bearing surface (e.g., a sheet of paper) may be folded, crumpled, wrinkled, or otherwise deformed before an image of such indicia-bearing surface is acquired, the resulting image of the document would likely be distorted.

SUMMARY OF THE DISCLOSURE

In accordance with one or more aspects of the present disclosure, an example method of processing images of deformed indicia-bearing surfaces includes: receiving, by a processing device, a document image; detecting, within the document image, a plurality of image fragments, wherein each image fragment of the plurality of image fragment contains a respective sequence of alphabet symbols; grouping the plurality of image fragments by lines of text to be reconstructed in the document image; generating a map of isolines associated with the document image, wherein an isoline identifies a set of points that lie on a straight line of an undistorted image corresponding to the document image; generating a reverse transformation matrix that defines a set of transformations to be applied to the document image in order to remove image distortions caused by deformations of an indicia bearing surface; and generating an undistorted document image by applying the reverse transformation matrix to the document image.

In accordance with one or more aspects of the present disclosure, an example system for processing images of deformed indicia-bearing surfaces comprises a memory and a processor coupled to the memory, the processor configured to: receive a document image; detect, within the document image, a plurality of image fragments, wherein each image fragment of the plurality of image fragment contains a respective sequence of alphabet symbols; group the plurality of image fragments by lines of text to be reconstructed in the document image; generate a map of isolines associated with the document image, wherein an isoline identifies a set of points that lie on a straight line of an undistorted image corresponding to the document image; generate a reverse transformation matrix that defines a set of transformations to be applied to the document image in order to remove image distortions caused by deformations of an indicia bearing surface; and generate an undistorted document image by applying the reverse transformation matrix to the document image.

In accordance with one or more aspects of the present disclosure, an example computer-readable non-transitory storage medium comprises executable instructions that, when executed by a processing device, cause the processing device to: receive a document image; detect, within the document image, a plurality of image fragments, wherein each image fragment of the plurality of image fragment contains a respective sequence of alphabet symbols; group the plurality of image fragments by lines of text to be reconstructed in the document image; generate a map of isolines associated with the document image, wherein an isoline identifies a set of points that lie on a straight line of an undistorted image corresponding to the document image; generate a reverse transformation matrix that defines a set of transformations to be applied to the document image in order to remove image distortions caused by deformations of an indicia bearing surface; and generate an undistorted document image by applying the reverse transformation matrix to the document image.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 2 schematically illustrates a set of isolines generated in accordance with aspects of the present disclosure.

FIG. 4 schematically illustrates a projection of a fragment of a document image on a set of bins, in accordance with aspects of the present disclosure.

DETAILED DESCRIPTION

Systems and methods for processing images of deformed indicia-bearing surfaces are described. An original document may be printed, typed, or handwritten on an indicia-bearing medium, such as paper, cloth, plastic, etc. As the indicia-bearing surface (e.g., a sheet of paper) may be folded, crumpled, wrinkled, or otherwise deformed before an image of such indicia-bearing surface is acquired, the resulting image of the document would likely be distorted. Furthermore, utilizing handheld imaging devices (e.g., smartphones) may introduce further distortions into the image (e.g., caused by the positioning of the imaging device in which the imaged surface normal is not parallel to the optical axis of the lens of the imaging device). The resulting image distortions may hinder various image processing tasks.

Accordingly, the present disclosure provides systems and methods for restoring undistorted images of deformed indicia-bearing surfaces, thus allowing efficient subsequent image processing (e.g., image structure analysis, field detection, optical character recognition (OCR), etc.).

In an illustrative example, a computing system implementing the systems and methods of the present disclosure, receives an image of an indicia-bearing surface that contains a document ("document image"). The document may be printed, embossed, hand-written or otherwise expressed on paper, cloth, metal, plastic, and/or various other media.

The computing system may then detect image fragments that contain respective sequences of alphabet symbols, which are delimited by white spaces, punctuation symbols, and/or other predefined symbols. The identified image fragments may be grouped by lines of text to be reconstructed.

The computing system may then generate a map of isolines. Each isoline identifies the positions, within the document image, of a set of points which, but for the distortion of the indicia-bearing surface, would have lied on a straight line that is parallel to the principal direction.

Based on the map of isolines, a reverse transformation matrix (e.g., shift map) is generated, which defines the transformations that may be applied to the distorted image in order to remove the image distortions caused by the deformations of the indicia bearing surface. The reverse transformation matrix may then be applied to the document image in order to reconstruct an undistorted image, as described in more detail herein below.

Various aspects of the methods and systems are described herein by way of examples, rather than by way of limitation. The systems and methods described herein may be implemented by hardware (e.g., general purpose and/or specialized processing devices, and/or other devices and associated circuitry), software (e.g., instructions executable by a processing device), or a combination thereof.

Figure 1:
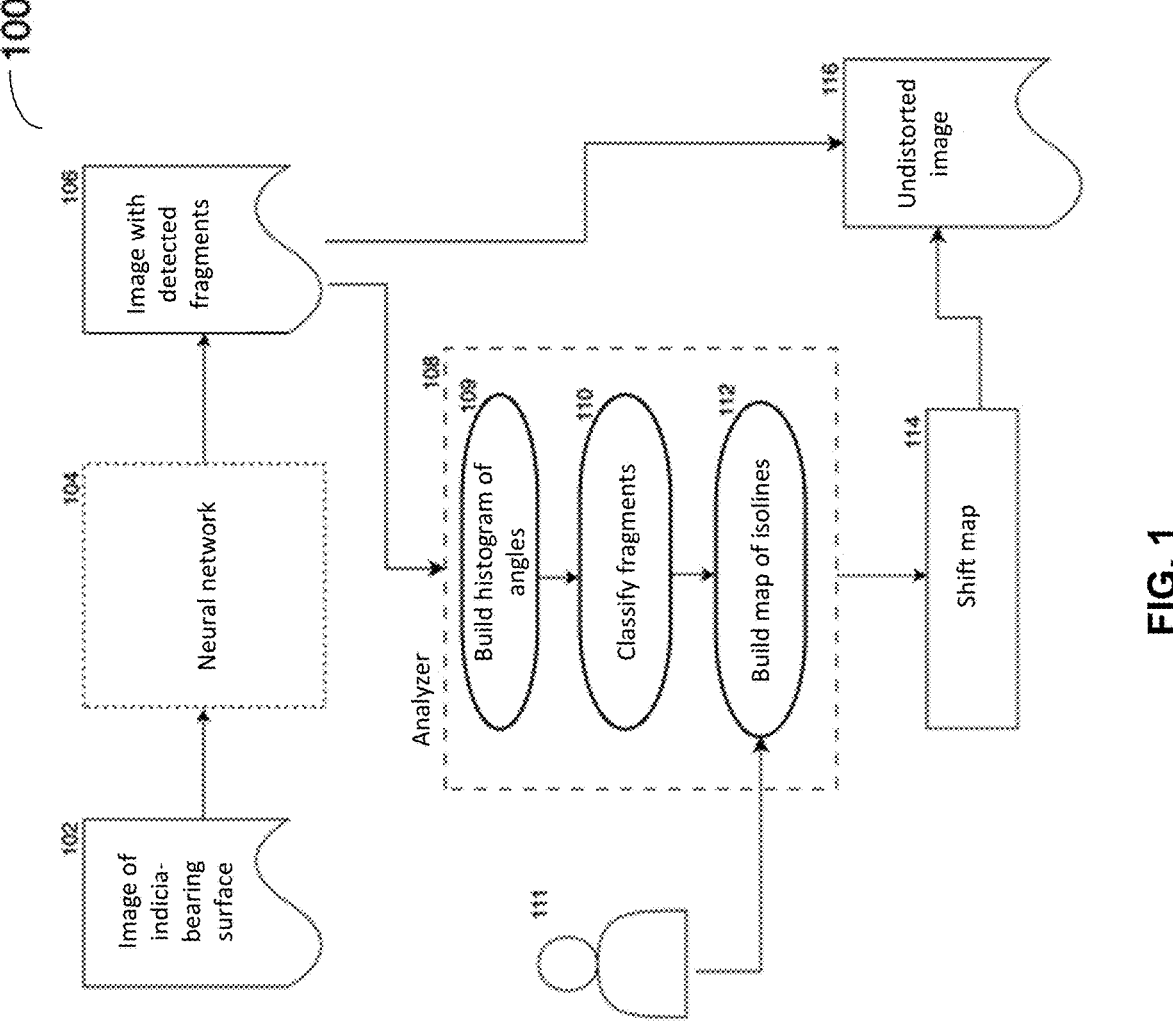
FIG. 1 schematically illustrates an example workflow 100 of processing images of deformed indicia-bearing surfaces, in accordance with aspects of the present disclosure.

FIG. 1 schematically illustrates an example workflow 100 of processing images of deformed indicia-bearing surfaces, in accordance with aspects of the present disclosure. The workflow 100 may be performed by processing logic that may comprise hardware (e.g., circuitry, dedicated logic, programmable logic, microcode, etc.), software, firmware, or a combination thereof. In some implementations, the method 100 may be performed by one or more computing devices (e.g., the computer system 1001 of FIG. 10). While FIG. 1 and the associated description list the operations of the workflow 100 in certain order, various implementations of the methods may perform at least some of the described operations in parallel and/or in arbitrary selected orders. In some implementations, one or more of the operations described herein may be omitted from the workflow 100.

The workflow 100 may be triggered by the processing logic receiving an image 102 of an indicia-bearing surface that contains a document ("document image"). As noted herein above, a document may be printed, embossed, hand-written or otherwise expressed on paper, cloth, metal, plastic, and/or various other media.

The processing logic may then feed the document image to the image fragment detector, which may be implemented, e.g., by the neural network 104. The image fragment detector detects, within the document image, image fragments (which in an undistorted image would have a rectangular or other predefined shape) that contain respective sequences of alphabet symbols (words) which are delimited by white spaces, punctuation symbols, and/or other predefined symbols. Each detected image fragment may be identified by a respective set of coordinates in the document image. In some implementations, along with the positions of individual words in the document image, the neural network 104 may also produce the positions of line separators, that are imaginary lines which are parallel to the strings of text and thus prevent the lines of the documents from merging with each other due to the image distortion caused by deformation of the indicia-bearing surface representing the original document. In an illustrative example, the neural network 104 may be implemented by a CRAFT (Character Region Awareness for Text Detection) text detector.

The output of the neural network 104 represented by the document image with detected image fragments 106 is then fed to the image analyzer 108, which performs certain image processing operations for removing the image distortion caused by deformation of the indicia-bearing surface representing the original document. In particular, the image analyzer 108 groups the image fragments by the lines of text, e.g., by determining which image fragments detected by the neural network 104 should belong to a single line of text and which image fragments should belong to two different (e.g., adjacent, but not necessarily related) lines of text.

For example, a document may contain two columns of text, each of which may contain multiple lines of text. In such a document, multiple image fragments representing individual words within a single column should be merged to form larger image fragments that presumably contain respective lines of text; however, two image fragments representing individual words from different columns should not be merged together.

Upon merging the image fragments corresponding to individual words into larger image fragments that would correspond to lines of text, the analyzer 108 may identify the principal text direction of the document image. For example, in European languages, the lines of text are oriented horizontally. Various visual objects (e.g., lines of texts) would be oriented along either the identified principal direction or along a secondary direction, which is orthogonal to the principal direction. Occurrence of other directions of lines of text within the document would be unlikely.

In order to identify the principal text direction, the analyzer 108 may, at operation 109, build a histogram of angles, with respect to a predefined direction, of all identified image fragments, which presumably correspond to lines of text. The maximum angle, among all angles of the histogram, would identify the principal direction of text lines.

Upon identifying the principal and secondary directions, each identified image fragment representing a respective line of text may be associated, at operation 110, with either the principal direction or the secondary direction. Notably, the image fragments may, due to the image distortion caused by the indicia-bearing surface deformation, be oriented under different angles with respect to the identified principal or secondary direction. The two groups of image fragments corresponding to the principal and secondary directions would then be processed separately, as described in more detail herein below.

In some implementations, various geometric characteristics of the identified image fragments, which in an undistorted image of the indicia-bearing surface would have a rectangular or other predefined shape, may be used as additional features for determining the parameters of the deformation of the document image. Such geometric characteristics may include, e.g., the image fragment stretching and/or angle relative to the identified principal direction of the text lines.

Figure 2:
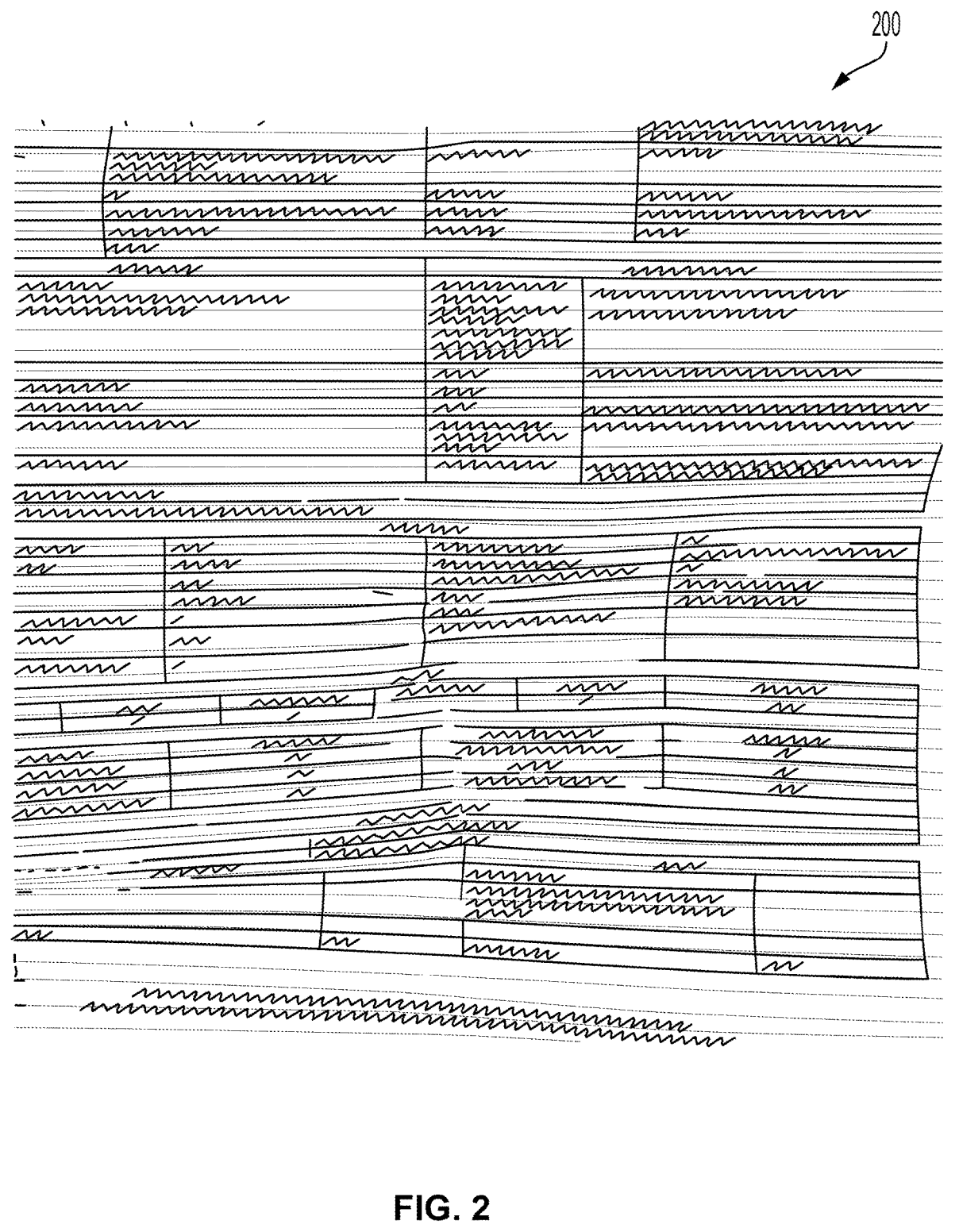

Upon identifying the image fragments associated with the principal direction, the analyzer 108 may, at operation 112, build a map of isolines, as schematically illustrated by FIG. 2. In some implementations, the operation 112 may be performed in an user-assisted mode with participation of the user 111. Each isoline identifies the positions, within the document image, of a set of points that are presumed to lie on a straight line that is parallel to the principal direction of an undistorted image corresponding to the document image.

Building the isolines may involve generating a map of image angles for chosen rectangular image fragments. In some implementations, the map of image angles may be generated for a scaled down (e.g., by a factor 1:4) image, in order to reduce the overall computational complexity and taking into account that the map of image angles corresponding to the original (unscaled) image would not be accurate due to the inaccuracies accumulated during the previous operations. Accordingly, after the isolines are generated, the scaled down image may be scaled back up (e.g., by a factor 4:1) to restore the original image size.

For the scaled down image, the map of image angles may be represented by a rectangular matrix, each element of which corresponds to a respective pixel of the scaled down image and contains the angle of the image rotation (with respect to the identified principal direction, such as horizontal) caused by the indicia-bearing surface deformation in that particular position within the image. In some implementations, all the identified angles may be limited by a predefined range, such as $[-\pi/6, \pi/6]$. Accordingly, a matrix element that corresponds to an image pixel located within one of the identified image fragment, is assigned the value of the angle associated with that image fragment. Conversely, a matrix element that corresponds to an image pixel located outside of all identified image fragments, is assigned the value that is produced, e.g., by interpolating the nearest known angle values.

Should two adjacent elements of the map of angles differ by more than a predefined threshold value (which may be caused, e.g., by a particularly intense deformation of the indicia-bearing surface in the vicinity of the corresponding location of the image), the values of those two adjacent elements may be smoothed, e.g., by applying a Gauss filter or a bilateral filter. The filtering operation may involve replacing the value of a given element of the matrix with a new value derived by applying averaging and weighting operations to the values associated with adjacent elements.

An image of an undistorted indicia-bearing surface may be associated with an imaginary rectangular coordinate grid. The deformations applied to the indicia-bearing surface may be viewed as transforming the original rectangular coordinate grid into a curved grid. Since the map of isolines reflects the distortions applied to the indicia-bearing surface, such a map may be utilized to transform the document image by restoring the original rectangular coordinate grid based on the curved grid.

The curved grid may be constructed by iterating through the image pixels, starting, e.g., from the leftmost and the uppermost pixel and iteratively moving to the right by selecting the next pixel at a predefined horizontal offset from the currently selected pixel and in the direction specified by the value stored in the element of angle map associated with the currently selected pixel. The predefined horizontal offset may, e.g., be equal to the average length of the identified image fragments. Such iterations may continue until the right border of the image is reached. Upon reaching the right border of the image, the next leftmost image pixel is selected, which may be located at a predefined vertical offset from the previous leftmost pixel. The iterations continue until the bottom right corner of the image is reached. These iterations thus produce a set of isolines, which represent the result of integrating the map of angles.

The above-described procedure generates the horizontal isolines only, which may be sufficient if no vertically-oriented lines of text are found in the document. Should the document contain vertically-oriented lines of text, a similar procedure may be performed for generating the vertical isolines, by replacing the left-to-right iterations through the matrix of angles with top-to-bottom (downward) iterations.

Assuming an ideal image fragment detector implemented by the neural network 104, the undistorted document image could have been constructed from the image of the deformed indicia-bearing surface using the constructed isolines. FIG. 2 schematically illustrates an image 200 containing a set of isolines that attempt to follow the direction of image fragments corresponding to respective lines of text, the orientation of each of which can deviate from the horizontal direction by a respective angle due to the image distortion caused by deformation of the indicia-bearing surface representing the original document. However, a practically implementable image fragment detector would necessarily yield some errors, which would necessitate performing the below described procedure for constructing an undistorted document image.

Figure 3:
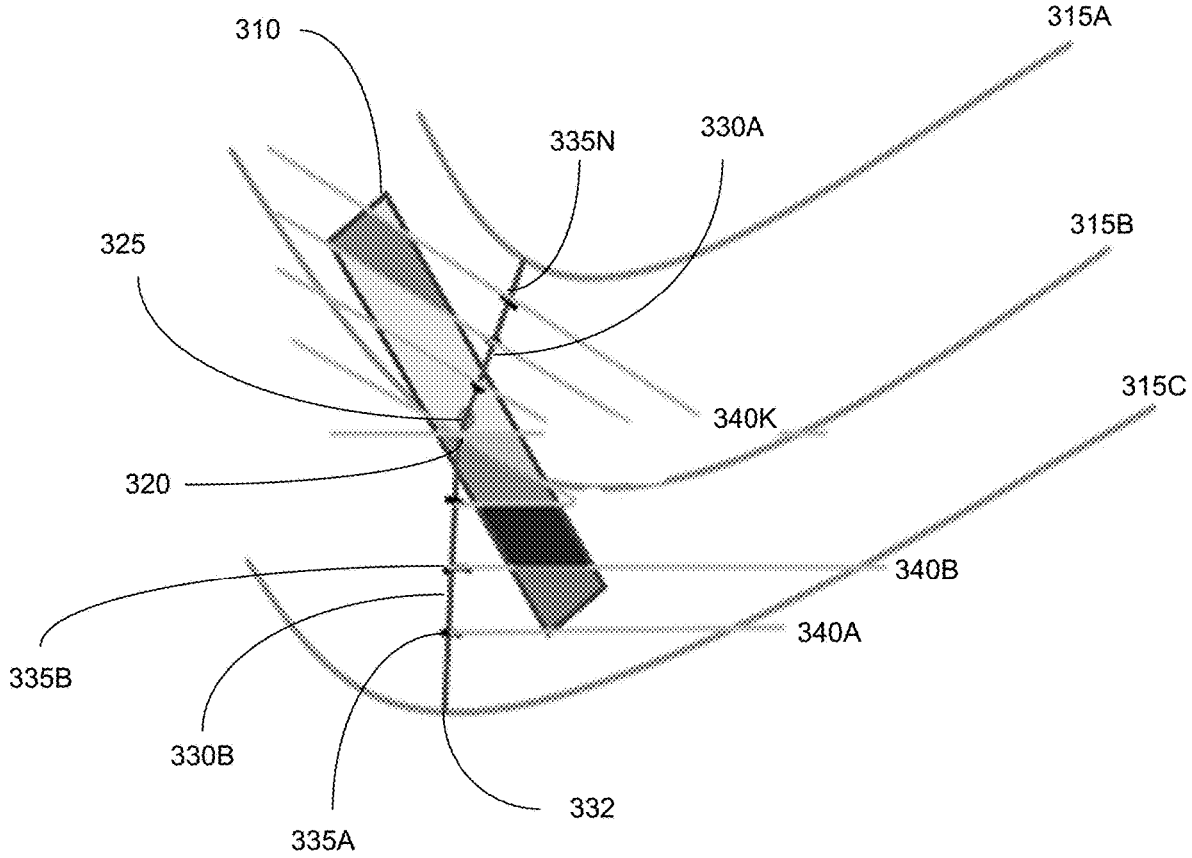
FIG. 3 schematically illustrates a subset of isolines generated for a fragment of a document image, in accordance with aspects of the present disclosure.

The analyzer 108 may iterate through the identified image fragments. As schematically illustrated by FIG. 3, for each image fragment 310, three isolines 315A-315C are identified that are adjacent to or intersect the image fragment 310. Then, the point 320 is identified on the isoline 315B, which is the nearest (among all points located on the isolines 315A-315C) point to the centroid 325 of the image fragment 310. From the identified point 320, a perpendicular line is built towards the adjacent isoline 315A, thus forming the straight-line segment 330A. Should the centroid 325 of the image fragment 310 be located outside of the area within two adjacent isolines 315B-315C, the identified point 320 on the isoline 315B is connected, by a straight line 330B, with the point 332 located on the isoline 315C and having the minimal, among all points of that isoline, distance to the centroid 325 of the rectangular fragment 310.

Each of the two resulting straight-line segments 330A-330B is then divided into a predefined number (e.g., four) of sub-segments of equal size, which are divided by points 335A-335N and corresponding perpendicular lines 340A-340K.

Figure 4:
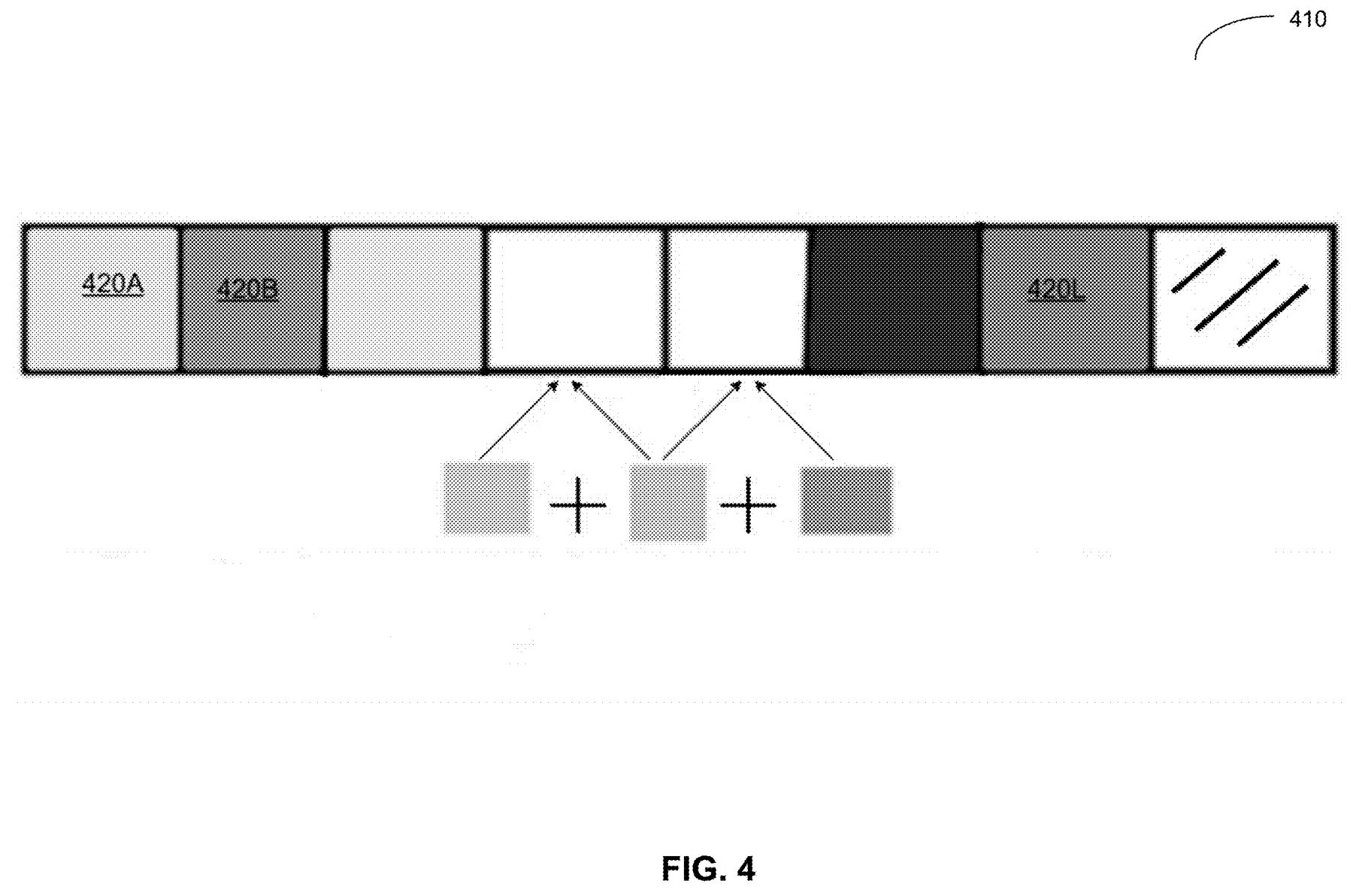

Then, as schematically illustrated by FIG. 4, for each image fragment 310, a corresponding numeric vector 410 is built, each element 420A-420L of which is represented by the number reflecting (e.g., derived, by a predefined mathematical transformation from) the area of the section ("bin") of the image fragment 310 that is defined by two adjacent perpendicular lines 340A-340K. Notably, some of the sections of the image fragment 310 may simultaneously belong to two sections of the image fragment 310, which would result in the corresponding elements of the vector 410 containing respective numbers that reflect the sum of the areas of the two section. Thus, each fragment 310 may be represented by a corresponding vector 410 having the number of elements which is equal to the product of the number of isolines and the number of the bins.

Since the sizes of the identified image fragments may vary, the numeric vectors representing respective fragments may be normalized, e.g., by dividing the value of each vector element by the sum of the original values of all elements of the vector.

The vector sum of all vectors representing the respective image fragments would represent the statistical distribution of the image fragments by the isolines.

The analyzer 108 may then assign the identified image fragments to text columns. Each identified image fragment is extended vertically, and the image fragments having their borders within a single region, are determined to belong to a single column of text.

Figure 5:
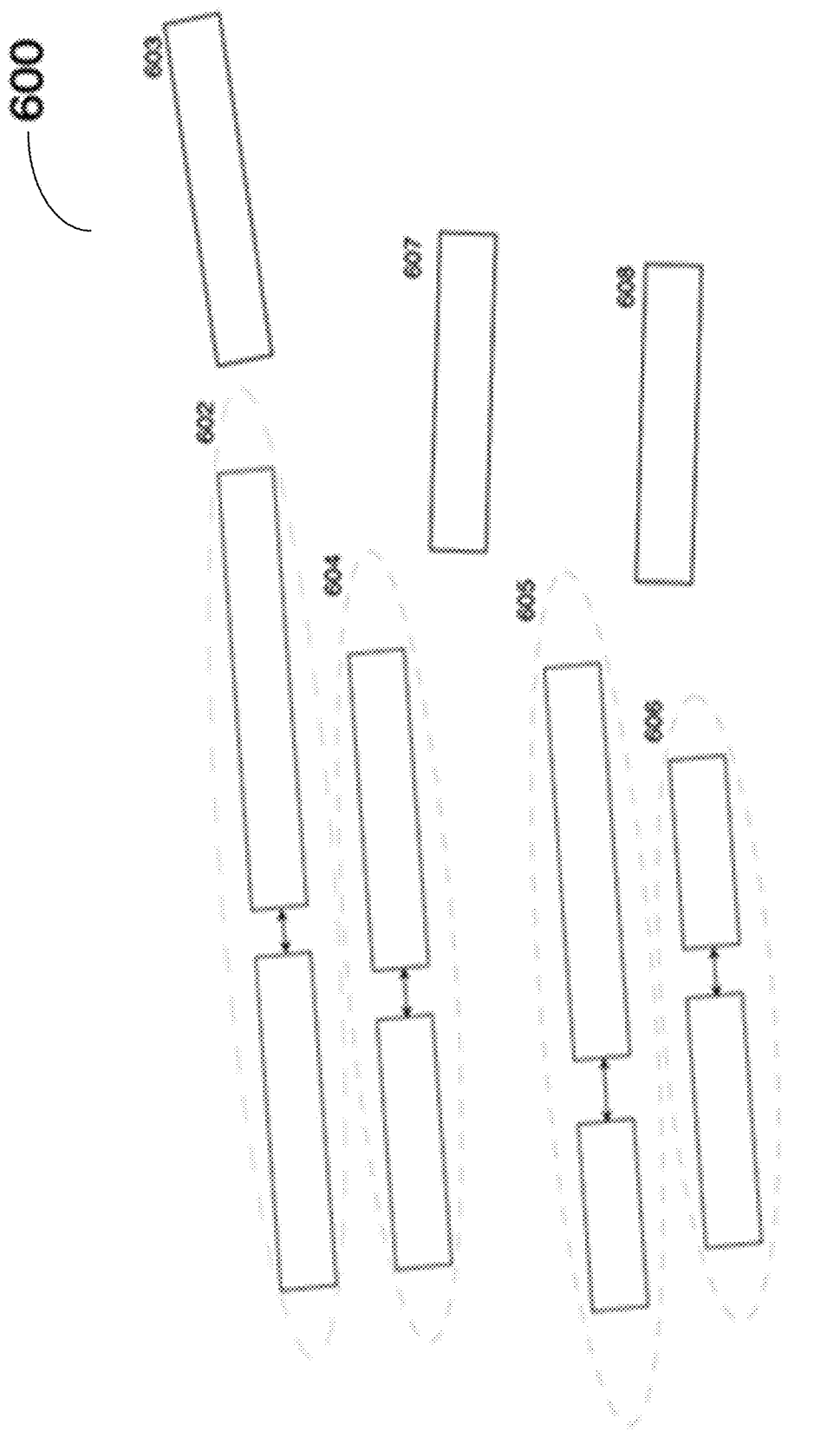
FIG. 5 schematically illustrates the image fragments generated in accordance with aspects of the present disclosure.

The analyzer 108 may then identify and merge the image fragments that belong to the same column, are located within no more than a predefined threshold distance from each other, have similar (e.g., different by no more than a predefined threshold angle) angles towards the identified principal text direction, and have similar heights (e.g., different by no more than a predefined threshold value). FIG. 5 schematically illustrates image 600 containing the image fragments 602-608, such that the image fragments 602, 604, 605, and 606 represent results of merging respective sets of two or more original image fragments.

Figure 6:
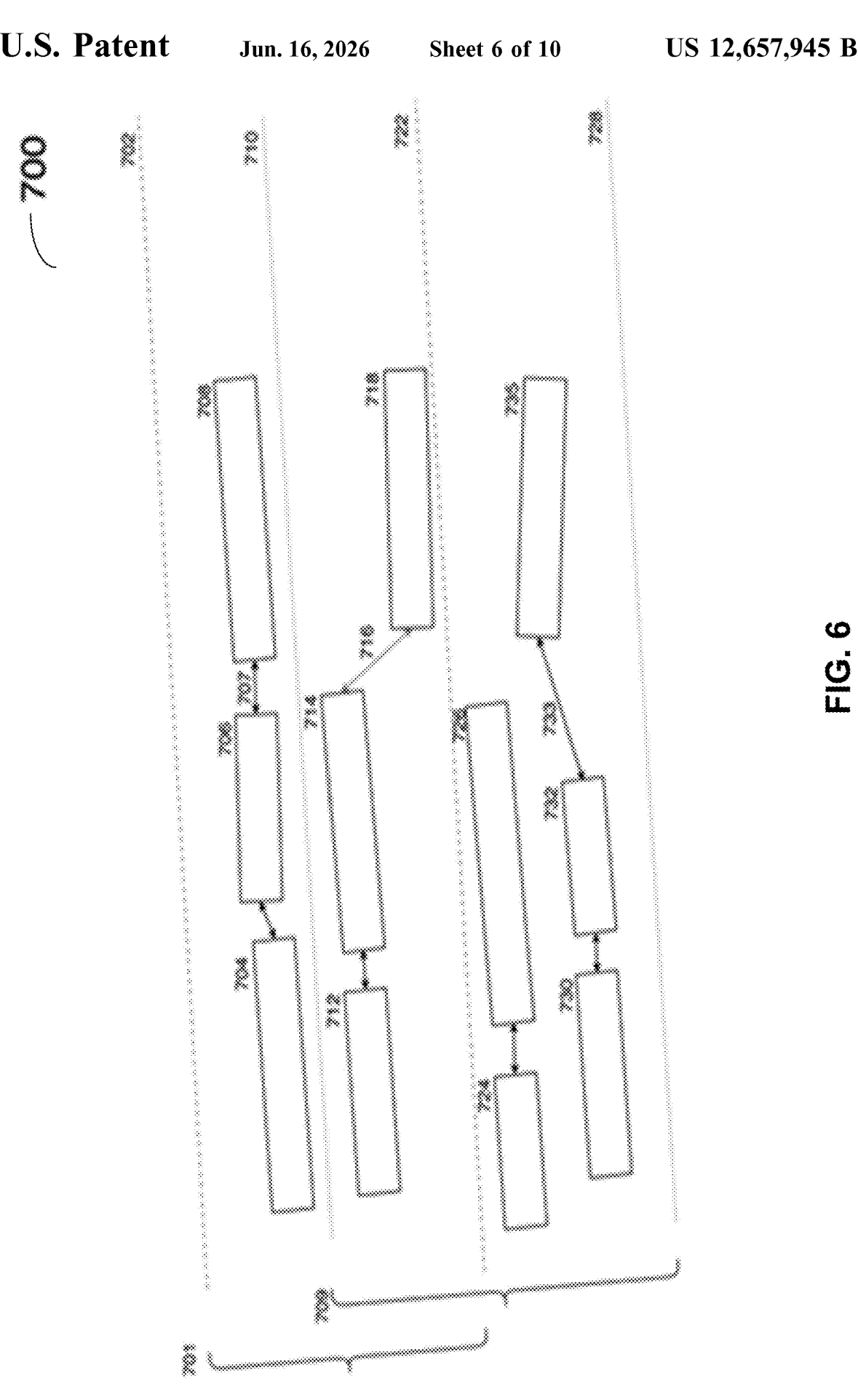
FIG. 6 schematically illustrates a result of hierarchical clustering of image fragments, in accordance with aspects of the present disclosure.

Then, the resulting image fragments within each column are grouped into horizontal sections, based on their vertical coordinates, in order to prevent merging of image fragments that are vertically divided by a more than a predefined threshold distance. Within each horizontal section, the image fragments are hierarchically clustered based on a chosen metric. In an illustrative example, the metric utilized for the hierarchical clustering may reflect the maximum, among all bins, difference between the elements of the numerical vectors representing the respective image fragments. As schematically illustrated by FIG. 6, the identified image fragments of image 700 are grouped into the horizontal section 701 and 709, which are defined by the dividing lines 702, 722$_H$710, 728. The hierarchical clustering results in the first cluster formed by operation 707 merging the image fragment 708 with already merged image fragments 704 and 706; the second cluster formed by operation 716 merging the image fragment 718 with already merged image fragments 712 and 714; and the cluster formed by operation 733 merging the image fragment 735 with already merged image fragments 730 and 732; no further merging operations were performed with respect to the cluster containing image fragments 724 and 726.

Figure 7:
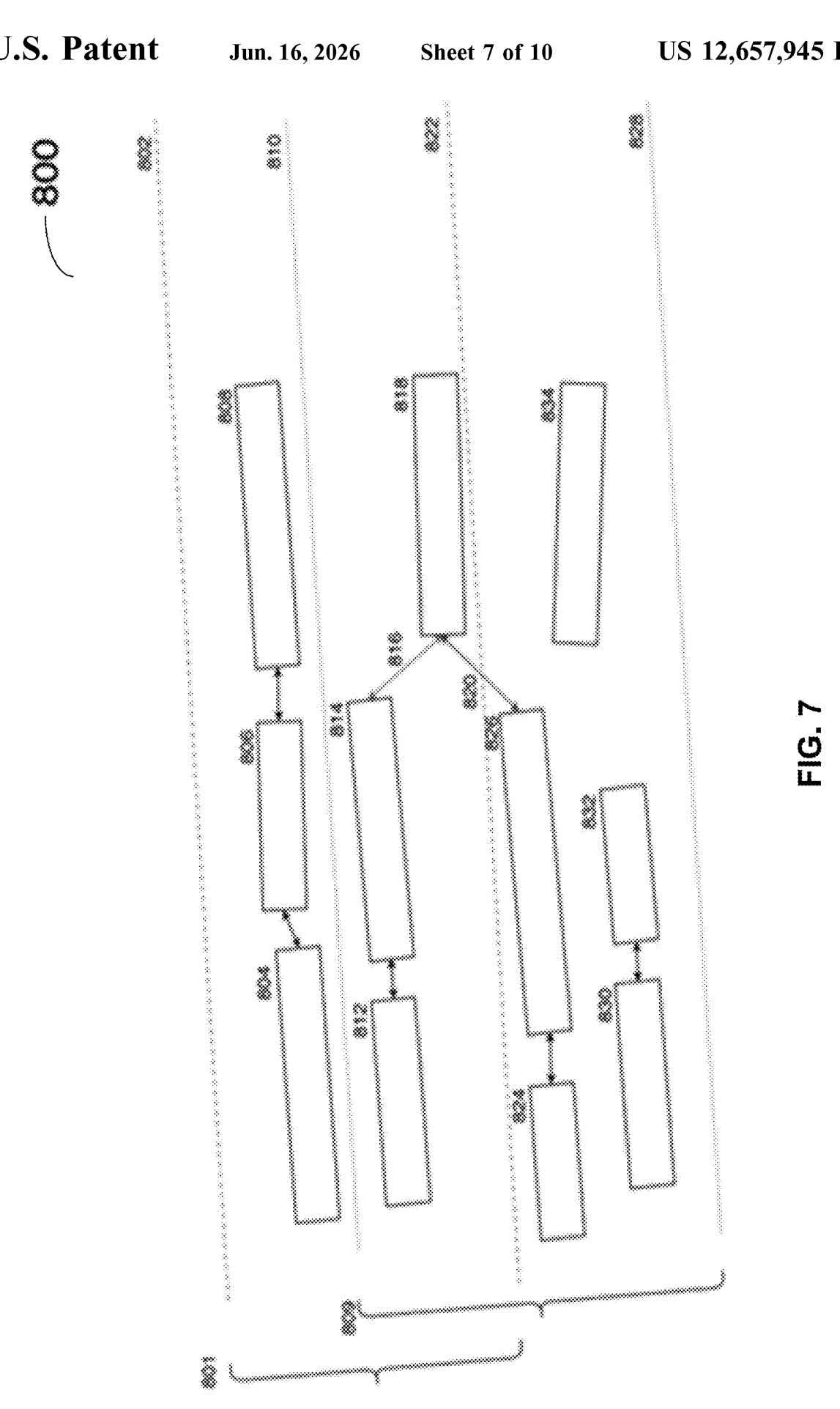
FIG. 7 schematically illustrates resolving a collision caused by hierarchical clustering of image fragments, in accordance with aspects of the present disclosure.

Notably, since the horizontal sections may intercept, assignment of some image fragments to the clusters may be conditional upon the assignment of those image fragments to horizontal sections, as schematically illustrated by FIG. 7.

In FIG. 7, two intersecting horizontal sections of the image 800 are defined: the horizontal section 801, which is defined by the dividing lines 802 and 822, and the horizontal section 809, which is defined by the dividing lines 810 and 828. Thus, the image fragment 818, which is located between the dividing lines 810 and 822, may be associated by the association operation 816 with the first cluster containing image fragments 812 and 814 or by the association operation 820 with the second cluster containing image fragments 824 and 826. No conflicts need to be resolved with respect to the cluster containing the image fragments 804, 806, 808; the cluster containing the image fragments 830, 832; or the image fragment 834, which is not associated with any clusters.

In order to resolve the conflicting assignment of the image fragment 818 to the first and second clusters, all image fragments associated with the conflicting clusters may be re-clustered by the hierarchical clustering procedure. Upon performing the re-clustering, the association operation 816 of the image fragment 818 with the image fragments 812,

814 wins over the possible alternative association operation 820 of the image fragment 818 image fragments 824, 826.

Upon completing the clustering process for all identified image fragments, which results in effective assigning the identified image fragments to respective lines and columns, the analyzer 108 attempts to identify vanishing points of the document image. A vanishing point is a point on the image plane in which projections of parallel lines appear to converge. Accordingly, the analyzer 108 extends multiple lines that begin in various positions (e.g., left and right borders of lines, paragraph, and columns of text) and are parallel to the identified lines of texts. Should at least a threshold number of those lines intersect in a single point, as schematically illustrated by FIG. 8, the analyzer 108 determines that the distortion of the image is caused by a special case of distortion, i.e., perspective distortion.

Figure 8:
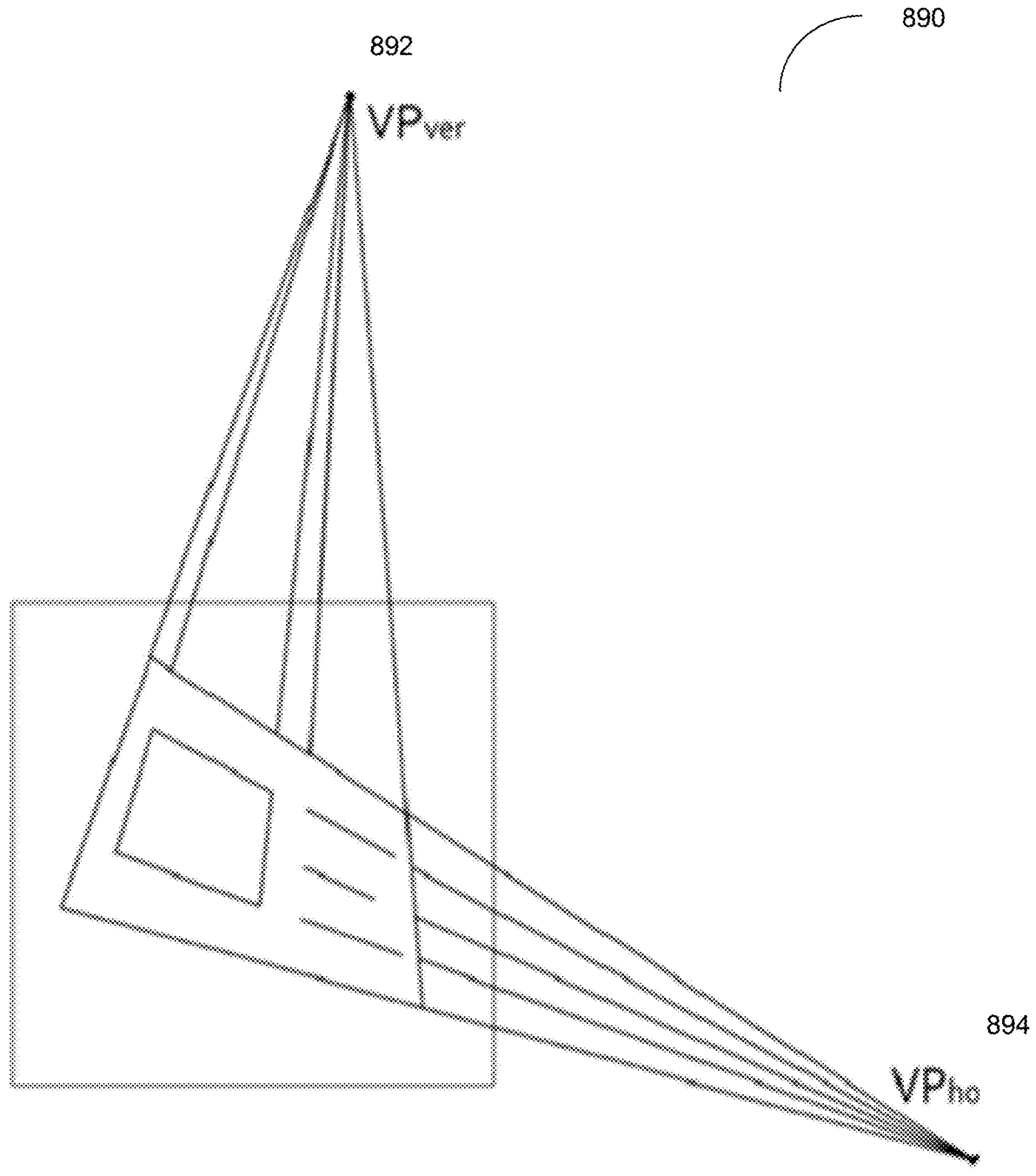
FIG. 8 schematically illustrates vanishing points of the image identified in accordance with aspects of the present disclosure.

In FIG. 8, the image 890 exhibits both horizontal and vertical perspective distortions. Accordingly, point 892 is a vertical vanishing point, and point 894 is a horizontal vanishing point of image 890.

The perspective distortion may be compensated for by applying a perspective distortion model for re-computing the coordinates of certain points within the image. Based on the coordinates of the identified vanishing points, a projective transformation matrix may be constructed that defines the transformations that may be applied to the original (undistorted) image in order to produce the distorted image exhibiting the perspective distortion characterized by the identified vanishing point. Based on the projective transformation matrix, a reverse projective transformation matrix is computed, which defines the reverse transformations (i.e., the transformations that may be applied to the distorted image exhibiting the perspective distortion characterized by the identified vanishing points in order to remove the image distortions caused by the deformations of the indicia bearing surface.

Accordingly, the analyzer 108 iterates through the identified lines of text, traversing each line from left to right. Using the reverse projective transformation matrix, the analyzer 108 re-computes (with the sub-pixel accuracy) the coordinates of each pixel within the line of text that is being traversed into the coordinates that the pixel would have in an undistorted image (i.e., in the absence of the indicia bearing surface deformation). The brightness of the pixel may be determined by interpolating the brightness of a predefined number of adjacent pixels identified by integer coordinates.

Conversely, if no vanishing points be identified within the image plane, or if an identified vanishing point is located at an infinite distance from the center of the image, the analyzer 108 utilizes the map of isolines for identifying subsets of image points that should be transformed to respective straight lines. Accordingly, for each of the identified isolines, a corresponding discrete function of the horizontal coordinate (X) is constructed, such that the function defines the value of the vertical coordinate (Y) that the pixel would have in an undistorted image (i.e., in the absence of the indicia bearing surface deformation).

Thus, for each pixel, a corresponding shift is defined as the difference between the actual vertical (Y) coordinate of the pixel and the value of the vertical coordinate (Y) that the pixel would have in an undistorted image. In some implementations, the resulting shift map 114 may be augmented by computing additional values of pixels located between the identified lines of text and/or in a predefined vicinity of the borders of the page. In some implementations, the shift map 114 may be further post-processed, e.g., by applying smoothing filters, etc.

The finalized shift map 114 may be used for reconstructing the undistorted document image 116. Using the shift map 114, the analyzer 108 re-computes (with the sub-pixel accuracy) the coordinates of each pixel within the line of text that is being traversed into the coordinates that the pixel would have in an undistorted image (i.e., in the absence of the indicia bearing surface deformation).

Figure 9:
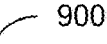
FIG. 9 is a flow diagram of an example method 900 of processing images of deformed indicia-bearing surfaces, in accordance with aspects of the present disclosure.

FIG. 9 is a flow diagram of an example method 900 of processing images of deformed indicia-bearing surfaces, in accordance with aspects of the present disclosure. The method 900 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 900 is performed by computing system 1001 of FIG. 10. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations.

At operation 910, the processing logic implementing the method receives an image of an indicia-bearing surface that contains a document ("document image"). As noted herein above, a document may be printed, embossed, hand-written or otherwise expressed on paper, cloth, metal, plastic, and/or various other media.

At operation 920, the processing logic detects, within the document image, image fragments (which in an undistorted image would have a rectangular or other predefined shape) that contain sequences of alphabet symbols (words) which are delimited by white spaces, punctuation symbols, and/or other predefined symbols. Each detected image fragment may be identified by a respective set of coordinates in the document image.

At operation 930, the processing logic groups the image fragments by the lines of text to be reconstructed, e.g., by identifying image fragments that should belong to a single line of text and/or image fragments that should belong to different (e.g., adjacent, but not necessarily related) lines of text.

At operation 940, the processing logic identifies the principal text direction of the document image. In an illustrative example, the processing logic may build a histogram of angles, with respect to a predefined direction, of all identified image fragments, which presumably correspond to lines of text. The maximum angle, among all angles of the histogram, would identify the principal direction of text lines.

At operation 950, the processing logic generates a map of isolines. Each isoline identifies the positions, within the document image, of a set of points which, but for the distortion of the indicia-bearing surface, would have lied on a straight line that is parallel to the principal direction, as described in more detail herein above.

At operation 960, the processing logic identifies clusters of image fragments, such clusters representing the lines of text, as described in more detail herein above.

At operation 970, the processing logic generates a reverse transformation matrix which defines the reverse transformations (i.e., the transformations that may be applied to the distorted image in order to remove the image distortions caused by the deformations of the indicia bearing surface. In an illustrative example, the reverse transformation matrix may be computed based on the identified vanishing points of the image. In an illustrative example, the reverse transformation matrix may be represented by a shift map which, for each pixel, defines a corresponding shift is defined as the difference between the actual vertical (Y) coordinate of the pixel and the value of the vertical coordinate (Y) that the pixel would have in an undistorted image, as described in more detail herein above.

At operation 980, the processing logic reconstructs the undistorted document image by applying the reverse transformation matrix to the document image, as described in more detail herein above.

Figure 10:
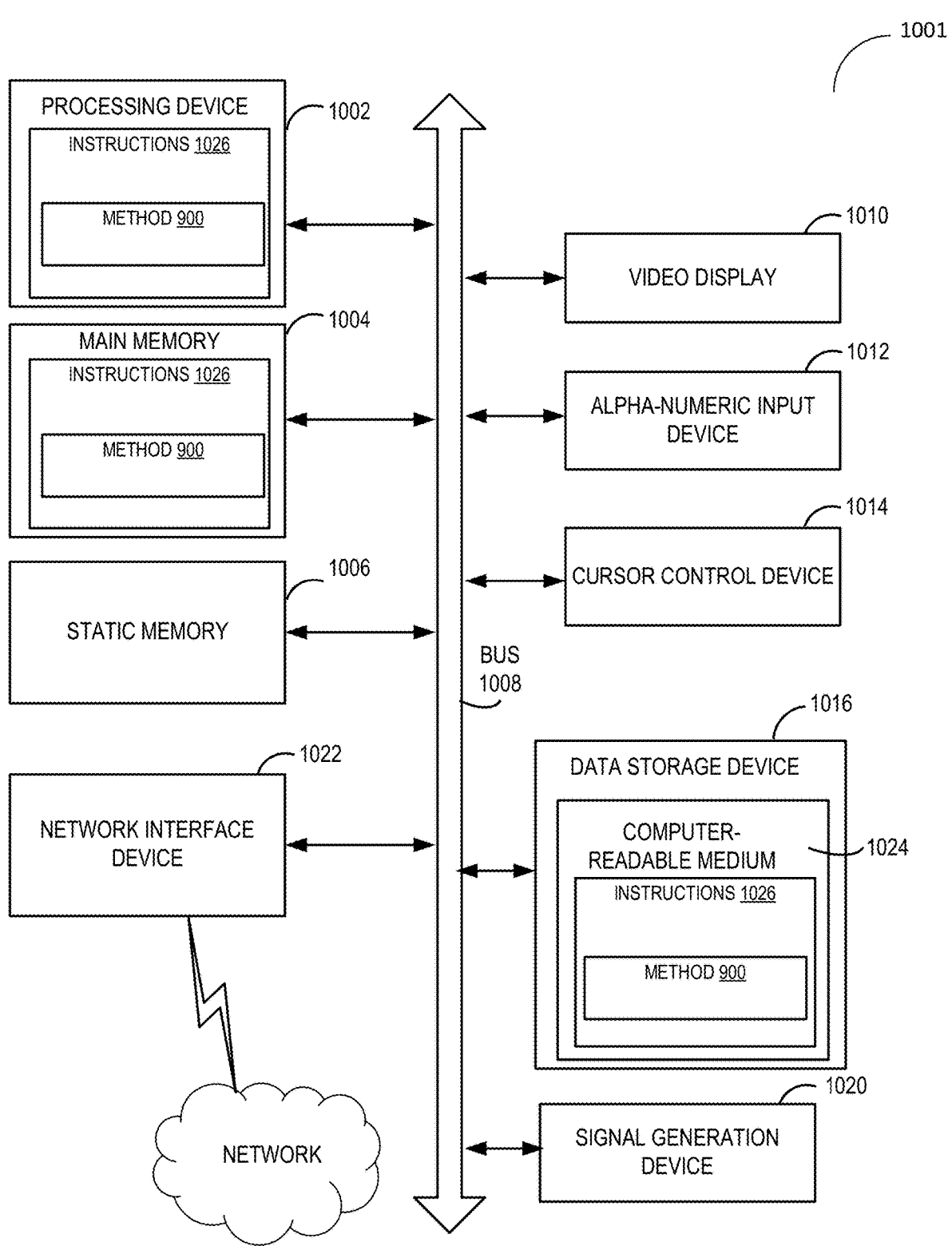
FIG. 10 illustrates a block diagram of a computer system in accordance with some implementations of the present disclosure.

FIG. 10 depicts an example computer system 1001 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1001 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for implementing the methods described herein (e.g., method 900 of processing images of deformed indicia-bearing surfaces).

The computer system 1001 may further include a network interface device 1022. The computer system 1001 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker). In one illustrative example, the video display unit 1010, the alphanumeric input device 1012, and the cursor control device 1014 may be combined into a single component or device (e.g., an LCD touch screen).

The data storage device 1016 may include a computer-readable medium 1024 on which is stored the instructions 1026 embodying any one or more of the methods or functions described herein. The instructions 1026 may also reside, completely or at least partially, within the main memory 1004 and/or within the processing device 1002 during execution thereof by the computer system 1001, the main memory 1004 and the processing device 1002 also constituting computer-readable media. In some implementations, the instructions 1026 may further be transmitted or received over a network via the network interface device 1022.

While the computer-readable storage medium 1024 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In some implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "some implementations" or "an implementation" or "some implementations" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:

receiving, by a processing device, a document image;

detecting, within the document image, a plurality of image fragments, wherein each image fragment of the plurality of image fragments contains a respective sequence of alphabet symbols;

grouping the plurality of image fragments by lines of text to be reconstructed in the document image;

generating a map of isolines associated with the document image, wherein an isoline identifies a set of points that lie on a straight line of an undistorted image corresponding the document image;

generating, based on the map of isolines, a reverse transformation matrix that defines a set of transformations to be applied to the document image in order to remove image distortions caused by deformations of an indicia bearing surface; and generating an undistorted document image by applying the reverse transformation matrix to the document image.

2. The method of claim 1, wherein the reverse transformation matrix is provided by a shift map.

3. The method of claim 2, wherein the shift map is represented by a matrix, which, for each pixel of a plurality of pixels of the document image, defines a corresponding shift as a difference between an actual value of a vertical coordinate of the pixel and a target value of the vertical coordinate in the undistorted document image.

4. The method of claim 1, wherein the reverse transformation matrix is computed based on a detected perspective distortion identified by a plurality of vanishing points.

5. The method of claim 1, further comprising:

identifying a principal direction of text of the document image.

6. The method of claim 1, wherein grouping the plurality of image fragments by lines of text further comprises:

performing hierarchical clustering of the plurality of image fragments.

7. The method of claim 1, wherein grouping the plurality of image fragments by lines of text is performed based on a histogram of angles of the image fragments with respect to a predefined direction.

8. A system comprising:

a memory; and a processing device operatively coupled to the memory, the processing device configured to:

receive a document image;

detect, within the document image, a plurality of image fragments, wherein each image fragment of the plurality of image fragments contains a respective sequence of alphabet symbols;

group the plurality of image fragments by lines of text to be reconstructed in the document image;

generate a map of isolines associated with the document image, wherein an isoline identifies a set of points that lie on a straight line of an undistorted image corresponding to the document image;

generate, based on the map of isolines, a reverse transformation matrix that defines a set of transformations to be applied to the document image in order to remove image distortions caused by deformations of an indicia bearing surface; and generate an undistorted document image by applying the reverse transformation matrix to the document image.

9. The system of claim 8, wherein the reverse transformation matrix is provided by a shift map.

10. The system of claim 9, wherein the shift map is represented by a matrix, which, for each pixel of a plurality of pixels of the document image, defines a corresponding shift as a difference between an actual value of a vertical coordinate of the pixel and a target value of the vertical coordinate in the undistorted document image.

11. The system of claim 8, wherein the reverse transformation matrix is computed based on a detected perspective distortion identified by a plurality of vanishing points.

12. The system of claim 8, wherein the processing device is further configured to:

identify a principal direction of text of the document image.

13. The system of claim 8, wherein grouping the plurality of image fragments by lines of text further comprises:

performing hierarchical clustering of the plurality of image fragments.

14. The system of claim 8, wherein grouping the plurality of image fragments by lines of text is performed based on a histogram of angles of the image fragments with respect to a predefined direction.

15. A non-transitory computer-readable storage medium comprising executable instructions that, when executed by a processing device, cause the processing device to:

receive a document image;

detect, within the document image, a plurality of image fragments, wherein each image fragment of the plurality of image fragments contains a respective sequence of alphabet symbols;

group the plurality of image fragments by lines of text to be reconstructed in the document image;

generate a map of isolines associated with the document image, wherein an isoline identifies a set of points that lie on a straight line of an undistorted image corresponding to the document image;

generate, based on the map of isolines, a reverse transformation matrix that defines a set of transformations to be applied to the document image in order to remove image distortions caused by deformations of an indicia bearing surface; and generate an undistorted document image by applying the reverse transformation matrix to the document image.

16. The non-transitory computer-readable storage medium of claim 15, wherein the reverse transformation matrix is provided by a shift map.

17. The non-transitory computer-readable storage medium of claim 16, wherein the shift map is represented by a matrix, which, for each pixel of a plurality of pixels of the document image, defines a corresponding shift as a difference between an actual value of a vertical coordinate of the pixel and a target value of the vertical coordinate in the undistorted document image.

18. The non-transitory computer-readable storage medium of claim 15, wherein the reverse transformation matrix is computed based on a detected perspective distortion identified by a plurality of vanishing points.

19. The non-transitory computer-readable storage medium of claim 15, further comprising executable instructions that, when executed by the processing device, cause the processing device to:

identify a principal direction of text of the document image.

20. The non-transitory computer-readable storage medium of claim 15, wherein grouping the plurality of image fragments by lines of text further comprises:

performing hierarchical clustering of the plurality of image fragments.

\* \* \* \* \*